C. W. DEANE.

Improvement in Sediment Collectors for Steam Boilers.

No. 4,635. Reissued Nov. 14, 1871.

Attest { J. F. Colby
James A. Woodbury

C. W. Deane
By his Attys
Hamm & Co

AM. PHOTO-LITHOGRAPHIC CO. N.Y. (OSBORNE'S PROCESS.)

C. W. DEANE.

Improvement in Sediment Collectors for Steam Boilers.

No. 4,635. Reissued Nov. 14, 1871.

Attest { J. T. Colby. James A. Woodbury.

C. W. Deane By his attys Hanson Thw

AM. PHOTO-LITHOGRAPHIC CO. N.Y. (OSBORNE'S PROCESS.)

UNITED STATES PATENT OFFICE.

COLLINS WOOD DEANE, OF PHILADELPHIA, PENNSYLVANIA.

IMPROVEMENT IN SEDIMENT-COLLECTORS FOR STEAM-BOILERS.

Specification forming part of Letters Patent No. 113,405, dated April 4, 1871; reissue No. 4,635, dated November 14, 1871.

*To all whom it may concern:*

Be it known that I, COLLINS WOOD DEANE, of Philadelphia, county of Philadelphia, State of Pennsylvania, have invented a Sediment-Collector for Steam-Boilers, of which the following is a specification:

My invention consists of apparatus, too fully explained hereafter to need preliminary description, for collecting and disposing of the sediment in steam-boilers.

Figure 1:
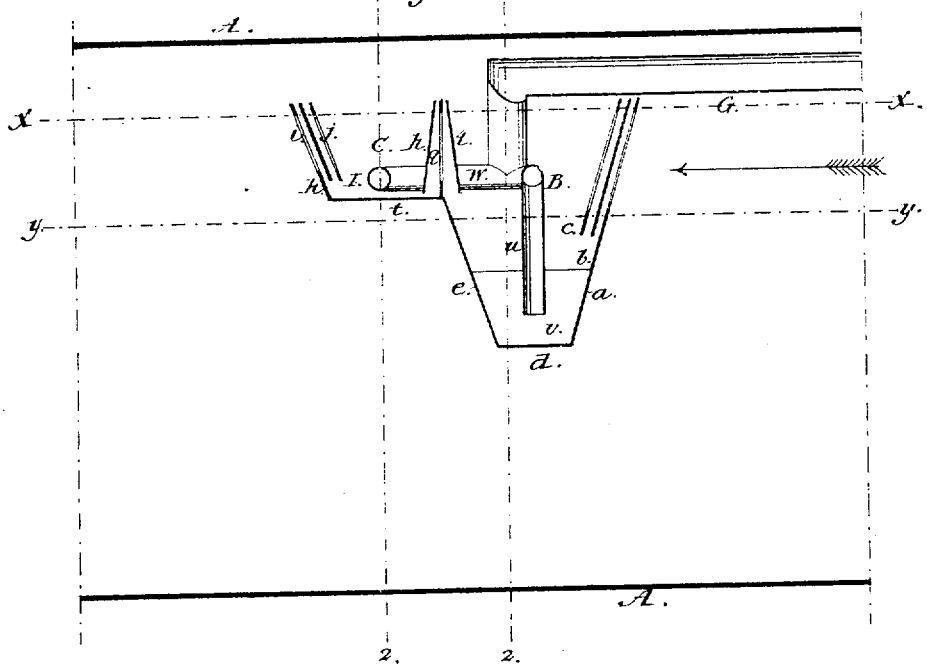
Figure 2:
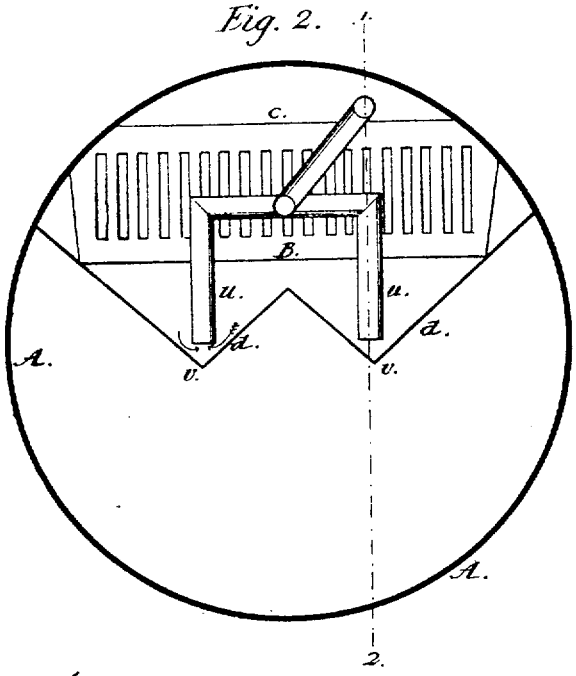
Figure 3:
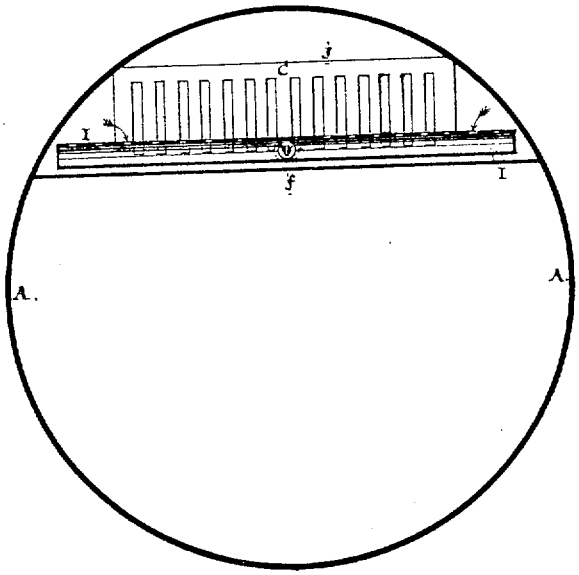

Figure 1, Sheet No. 1, is a section, on the line 1 2, Fig. 2, of part of a steam-boiler with my improved sediment-collector; Fig. 2, a transverse section on the line 1 2, Fig. 1; Fig. 3, Sheet No. 2, a transverse section on the line 1 2, Fig. 1; and Fig. 4, a sectional plan of part of Fig. 1.

Figure 4:
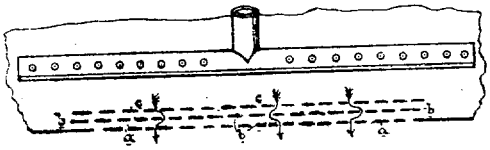

A represents a portion of the body or shell of a steam-boiler, the dotted line *x x* representing the highest and the dotted line *y y* the lowest water-line. There are two mud-traps, B and C, in the present instance, within the shell of the boiler, the former being composed of the inclined plates *a*, *b*, and *c*, bottom plate *d*, and inclined plate *e;* and the trap C consisting of the bottom plate *f* and inclined plates *h i j;* and these two traps are separated from each other by the plates *p*, *q*, and *t*. All these plates are connected to the shell of the boiler and extend across the same at their upper edge, although they may not extend entirely across at the water-line. In the plates *a*, *b*, and *c*, which are arranged at a short distance apart from each other, is a series of parallel vertical slots, extending in altitude from the lowest water-line *y* to the highest water-line *x*, the plates *b* and *c* extending downward but a short distance below the line *y*. The slots in the three plates are so arranged that those in the middle plate *b* are opposite to the spaces between the slots in the plates *a* and *c*, as shown in Fig. 4. The same arrangement of slots is observed with the plates *p*, *q*, and *t*, which form the partition between the two traps B and C, and a like system of slots is arranged in the plates *h i j*. It will be observed, on reference to Fig. 2, that in the bottom *d* of the trap B there are two depressions, *v v*, in which are suspended two pipes, *u u*, communicating with a larger horizontal pipe, G, which extends through the shell of the boiler, and is furnished with a suitable valve or cock. The bottom *f* of the trap C is straight, as shown in Fig. 3, and on or near the bottom of this trough is placed a horizontal pipe, I, perforated on the top and sides with a number of holes, as shown, and this pipe communicates, through a branch, *w*, with the main pipe G.

In steam-boilers there is a constant current of water, at and near the surface, from the fire-box end to the opposite end, and this current carries with it the mud or sediment which is present in all boilers, and which, if it remains there, is converted into hard incrustation. The object of my invention is to effectually remove this sediment from the boiler. The current of the surface-water in the boiler, Fig. 1, flows rapidly from the fire-box end in the direction of the arrow, and this current is, in the first instance, intercepted by the plate *a* of the trap B, and as this plate extends across or nearly across the boiler there is no other course for the current to pursue than through the slots of the said plate *a*. Many of the particles of sediment which pass with the water through the slots of the plate *a* strike the plate *b* between the slots of the latter plate and are directed to the bottom of the trap B, where the water is necessarily in a quiescent state. Other particles which may pass through the slots of the plate *b* are arrested by the ribs between the slots of the third plate *c*, and these again are directed toward the bottom of the trap. The current of water, still impregnated with more or less mud and sediment, must next pass through the slots of the plates *p*, *q*, and *t*, forming the partition between the two traps; and here again a like filtering process takes place, the particles of mud being directed either to the bottom of the trap B or that of the trap C. On the immediate surface of the water, however, there is always a fine sediment, which is apt to escape the filtering action of even two sets of slotted plates; hence the adoption of the trap C and the third set of filtering-plates *h*, *i*, and *j*, which serve effectually to arrest the fine mud. When the coarser sediment has collected in the trap B and the finer sediment in the trap C to an extent which demands the removal of both accumulations, the cock or valve in which the pipe G terminates is opened and the pressure of steam will force the mud upward from the trap B through the pipes *u u*, and thence through the said pipe G; at the same time the pressure of steam will force the finer mud through the perforations of the pipe I, and thence through the branch *w* and through the said pipe G.

I am aware that mud-traps bounded by slotted filtering-plates and communicating with pipes for the discharge of accumulated mud have been used; but these have been restricted in utility, owing to the arrangement which permitted a large portion of the surface-current of water to pass unfiltered; whereas the mud-traps in my invention are extended across or nearly across the shell of the boiler, and thus compel the current to pass through the slotted plates.

There may be one depression, *v*, only in the bottom of the mud-trap B, and one discharge-pipe, *u;* or there may be three or more such depressions and a corresponding number of discharge-pipes, according to the shape and size of the boiler; in fact, the mud-traps may be modified in shape to suit the style of the boiler.

A prominent feature of my invention is the combination of the depressions *v* with suspended pipes *u*, independent of the trap, and the lower open ends of which are within the said depressions. This feature is of special importance in locomotive-boilers, where a discharge-pipe projecting downward from the trap would interfere with the cleansing of the tubes, and where, owing to the agitation to which the parts are subjected, too great a strain on the parts would result from suspending the trap to the pipes.

I claim—

1. A mud-trap having the within-described slotted filtering-plates, arranged within a steam-boiler so that the entire surface-current may traverse the same in passing from end to end of the boiler.

2. The mud-trap B with its filtering-plates, the whole extending across or nearly across the shell of the boiler, as set forth.

3. The surface mud-trap C with its slotted filtering plates extending across or nearly across the boiler, in combination with the perforated discharge-pipe I.

4. The within-described combination and arrangement of the two mud-traps B and C with their filtering-plates.

5. The combination of one or more depressions, *v*, in the trap B with a corresponding number of suspended discharge-pipes.

6. The combination of a trap with two or more independent suspended discharge-pipes communicating with a larger pipe, by which the mud is discharged from the boiler, as set forth.

In testimony whereof I have signed my name to this specification in the presence of two subscribing witnesses.

COLLINS W. DEANE.

Witnesses:
WM. A. STEEL,
HARRY SMITH.

(148)